US010324659B2

United States Patent
Guo et al.

(10) Patent No.: US 10,324,659 B2
(45) Date of Patent: Jun. 18, 2019

(54) DETECTION OF OVER-ACCESS OF MEMORY SHARED AMONG MULTIPLE PROCESSES

(71) Applicant: International Business Machines Corporation, Armonk, NY (US)

(72) Inventors: Yi Guo, Beijing (CN); Shaorong Li, Beijing (CN); Mingquan Rao, Tianjin (CN); Youcheng Yang, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/603,549

(22) Filed: May 24, 2017

(65) Prior Publication Data

US 2018/0341428 A1 Nov. 29, 2018

(51) Int. Cl.
*G06F 3/06* (2006.01)
(52) U.S. Cl.
CPC .......... *G06F 3/0659* (2013.01); *G06F 3/0619* (2013.01); *G06F 3/0656* (2013.01); *G06F 3/0673* (2013.01)
(58) Field of Classification Search
CPC ........ G06F 3/06; G06F 3/0659; G06F 3/0673; G06F 3/0619; G06F 3/0656
See application file for complete search history.

(56) References Cited

U.S. PATENT DOCUMENTS

| | | | |
|---|---|---|---|
| 7,434,020 B2 | 10/2008 | Swafford et al. | |
| 7,827,375 B2 | 11/2010 | Abrashkevich et al. | |
| 9,779,034 B2* | 10/2017 | Jaeger | G06F 12/1475 |
| 2006/0136876 A1* | 6/2006 | Melamed | G06F 11/3672 717/124 |
| 2008/0148102 A1 | 6/2008 | Tseytin et al. | |
| 2011/0173505 A1 | 7/2011 | Bae et al. | |
| 2014/0237199 A1* | 8/2014 | Murray | G06F 8/52 711/159 |

OTHER PUBLICATIONS

Greene, Managing Domino Memory, http://www.ibmsystemsmag.com/CMSTemplates/IBMSystemsMag/Print.aspx?path=/ibmi/administrator/domino/Managing-Domino-Memory, IBM Systems Magazine, Nov. 2006, 3 pages.
Preventing Memory Overwrite Problem for Shared Memory using Exclusive Access of AMBA AXI, https://www.einfochips.com/blog/k2-categories/semiconductor/preventing-memory-overwrite-problem-for-shared-memory-using-exclusive-access-of-amba-axi.html, eInfochips blog, Oct. 26, 2016, 7 pages.

* cited by examiner

*Primary Examiner* — David Yi
*Assistant Examiner* — Zubair Ahmed
(74) *Attorney, Agent, or Firm* — Anthony Curro; Edell, Shapiro & Finnan, LLC

(57) ABSTRACT

A method, a computing system and a computer program product are provided. A first process of multiple processes sets access rights regarding a shared memory buffer from a shared memory to read/write, the shared memory buffer having been allocated and provided to the first process by a second process of the multiple processes. The first process sets access rights regarding a supplemental memory area of the shared memory buffer to no access, the supplemental memory area being before a usable buffer portion of the shared memory buffer, after the usable buffer portion of the shared memory buffer, or both before and after the usable buffer portion of the shared memory buffer. The first process stops executing when the first process attempts to access any portion of the supplemental memory area.

17 Claims, 6 Drawing Sheets

DETECTION OF OVER-ACCESS OF MEMORY SHARED AMONG MULTIPLE PROCESSES

BACKGROUND

Present invention embodiments are related to systems, methods and computer program products for detecting over-access of shared memory that is shared across multiple processes. In particular, present invention embodiments are related to systems, methods and computer program products for detecting a point at which an area of shared memory, which is not intended for use by an application, is read or written by the application.

One existing memory manager provides an ability to allocate memory shared among multiple processes. Any of the processes could access the same shared memory with the same handle value used by the memory manager to identify an allocated portion of the shared memory. When program code reads or writes to a buffer of shared memory beyond an end of the buffer, program code and/or data may become corrupted. As a result, at a later time when the corrupted program code is executed or the corrupted data is used, the program code may crash, thereby making it difficult to determine which part of the program code was a root cause of the crash because the crash may not occur close in time to an occurrence of the root cause.

One method of debugging memory over-access, provided by a Microsoft Windows operating system (available from Microsoft Corporation of Redmond, Wash.), includes an inaccessible memory page following every buffer allocated from a process' private memory manager. However, this method does not work with memory shared among multiple processes.

Another memory manager currently uses a debug method for detecting whether a shared memory was overwritten. The debug method includes adding a signature at end bytes of each allocated buffer of shared memory. When program code translates a handle value of an allocated buffer of shared memory to a native memory pointer or frees the buffer, the end bytes of the buffer are checked to determine whether the signature remains unchanged. Shared memory is determined to be overwritten when the signature at the end bytes is determined to be changed. However, when using this debug method, it remains difficult to determine an exact point at which the shared memory is overwritten. Further complicating debug efforts, the program code could crash while executing a totally unrelated function that uses a corrupted portion of the shared memory before the end bytes of the buffer are checked for the signature. In addition, this method does not address reading data beyond a usable portion of a buffer of shared memory.

SUMMARY

In an embodiment, a computer-implemented method is provided for detecting over-access of memory shared among multiple processes. A first process of the multiple processes may set access rights regarding a shared memory buffer from the shared memory to read/write, the shared memory buffer having been allocated and provided to the first process by a second process of the multiple processes. The first process may set access rights regarding a supplemental memory area of the shared memory buffer to no access, the supplemental memory area being before a usable buffer portion of the shared memory buffer, after the usable buffer portion of the shared memory buffer, or both before and after the usable buffer portion of the shared memory buffer. Thereafter, when the first process accesses any portion of the supplemental memory area, the first process stops executing.

In another embodiment, a system is provided to detect over-access of shared memory shared among multiple processes. The system includes at least one processor executing the multiple processes of an application, a memory having a portion which includes a shared memory shared among the multiple processes, and a communication bus connecting the at least one processor with the memory. A first process of the multiple processes may set access rights regarding a shared memory buffer from the shared memory to read/write, the shared memory buffer having been allocated and provided to the first process by a second process of the multiple processes. The first process sets access rights regarding a supplemental memory area of the shared memory buffer to no access, the supplemental memory area being before a usable buffer portion of the shared memory buffer, after the usable buffer portion of the shared memory buffer, or both before and after the usable buffer portion of the shared memory buffer. When the first process accesses any portion of the supplemental memory area, the first process stops executing.

In a further embodiment, a computer program product is provided. The computer program product includes at least one computer readable storage medium having computer readable program code embodied therewith for execution on at least one processor. The computer readable program code is configured to be executed by the at least one processor to perform: setting, by a first process of multiple processes, access rights regarding a shared memory buffer from a shared memory to read/write, the shared memory buffer having been allocated and provided to the first process by a second process of the multiple processes; setting, by the first process, access rights regarding a supplemental memory area to no access, the supplemental memory area being before a usable buffer portion of the shared memory buffer, after the usable buffer portion of the shared memory buffer, or both before and after the usable buffer portion of the shared memory buffer; and the first process stops executing when the first process accesses any portion of the supplemental memory area.

BRIEF DESCRIPTION OF THE DRAWINGS

Generally, like reference numerals in the various figures are utilized to designate like components.

DETAILED DESCRIPTION

Present invention embodiments include methods, systems and computer program products for facilitating debugging of memory over-access for memory shared among multiple processes. A memory over-access occurs when a process reads or writes outside of an address range of an area of memory to which the process was intended to read or write. As an example, a memory over-access occurs when a process reads from or writes to a one hundred and first element of an array, which has a maximum of one hundred elements. A memory over-access may not be noticeable until sometime after the memory over-access occurred, thereby making it difficult to find an exact point at which the memory over-access occurred.

In various embodiments, when a process uses a shared memory buffer allocated by a different process, the shared memory buffer is accessed via a handle value, which identifies the shared memory buffer. The process translates the handle value into a native memory pointer that points to the shared memory buffer. At this point, before accessing the shared memory buffer, the process may set access rights to read/write regarding the complete shared memory buffer, thereby giving the process authorization to read from and write to any portion of the complete shared memory buffer.

Each shared memory buffer may have a usable buffer portion and an area outside of the usable buffer portion. The usable buffer portion is an area that is intended for use by various applications. The area of each shared memory buffer that is outside of the usable buffer portion is not intended for use by the various applications. Instead, this area may be used by a memory manager or an operating system.

Next, the process may set the access rights to no access regarding a tail memory area of the shared memory buffer. The tail memory area may be a portion of the shared memory buffer that extends from immediately beyond the usable portion of the shared memory buffer to a memory page boundary. In some embodiments, the tail memory area may have a predetermined fixed size such as, for example, 200 bytes, or another size. Setting of the access rights by the process may affect only the access rights of the process and no other processes.

After the process sets the access rights, if the process reads from or writes to any portion of the tail memory area, an exception is raised to an application associated with the processes, thereby causing the application and the associated processes to stop executing at a point at which a memory over-access occurs, or shortly thereafter, making it easier to determine a cause of the memory over-access.

Figure 1:
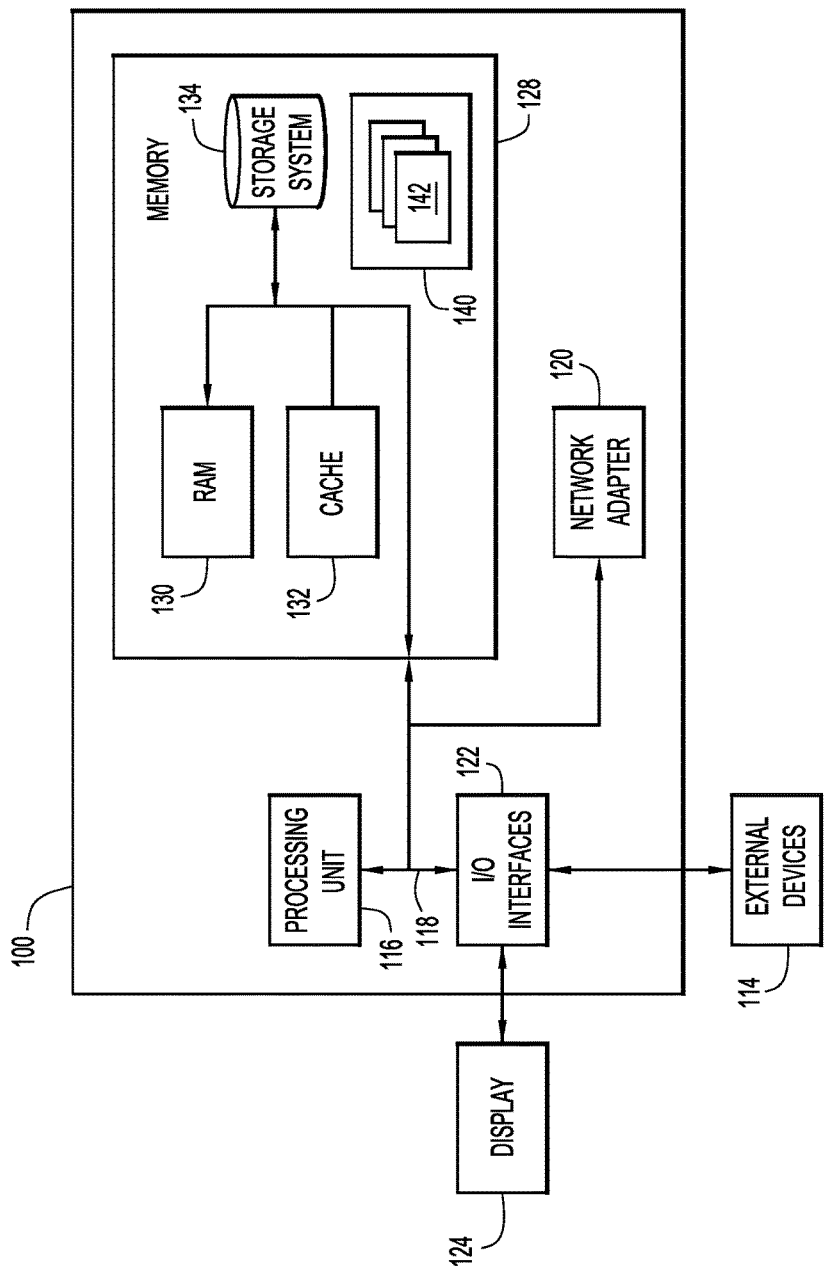
FIG. 1 illustrates a functional block diagram of an example computing system that can be used to implement various embodiments of the invention.

FIG. 1 is a functional block diagram of a computing system 100 that may implement various embodiments of the invention. Computing system 100 is shown in a form of a general-purpose computing device. Components of computing system 100 may include, but are not limited to, one or more processors or processing units 116, a system memory 128, and a bus 118 that couples various system components including system memory 128 to one or more processors 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computing system 100 typically includes a variety of computer system readable media. Such media may be any available media that is accessible by computing system 100, and may include both volatile and non-volatile media, removable and non-removable media.

System memory 128 can include computer system readable media in the form of volatile memory, such as random access memory (RAM) 130 and/or cache memory 132. Computing system 100 may further include other removable/non-removable, volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. As will be further depicted and described below, memory 128 may include at least one program product having a set (e.g., at least one) of program modules that are configured to carry out the functions of embodiments of the invention.

Program/utility 140, having a set (at least one) of program modules 142, may be stored in memory 128 by way of example, and not limitation, as well as an operating system, one or more application programs, other program modules, and program data. Each of the operating system, the one or more application programs, the other program modules, and the program data or some combination thereof, may include an implementation of a networking environment. Program modules 142 generally carry out the functions and/or methodologies of embodiments of the invention as described herein.

Computing system 100 may also communicate with one or more external devices 114 such as a keyboard, a pointing device, a display 124, etc.; one or more devices that enable a user to interact with computing system 100; and/or any devices (e.g., network card, modem, etc.) that enable computing system 100 to communicate with one or more other computing devices. Such communication can occur via Input/Output (I/O) interfaces 122. Still yet, computing system 100 can communicate with one or more networks such as a local area network (LAN), a general wide area network (WAN), and/or a public network (e.g., the Internet) via network adapter 120. As depicted, network adapter 120 communicates with the other components of computing system 100 via bus 118. It should be understood that, although not shown, other hardware and/or software components could be used in conjunction with computing system 100. Examples, include, but are not limited to: microcode, device drivers, redundant processing units, external disk drive arrays, RAID systems, tape drives, and data archival storage systems, etc.

Figure 2:
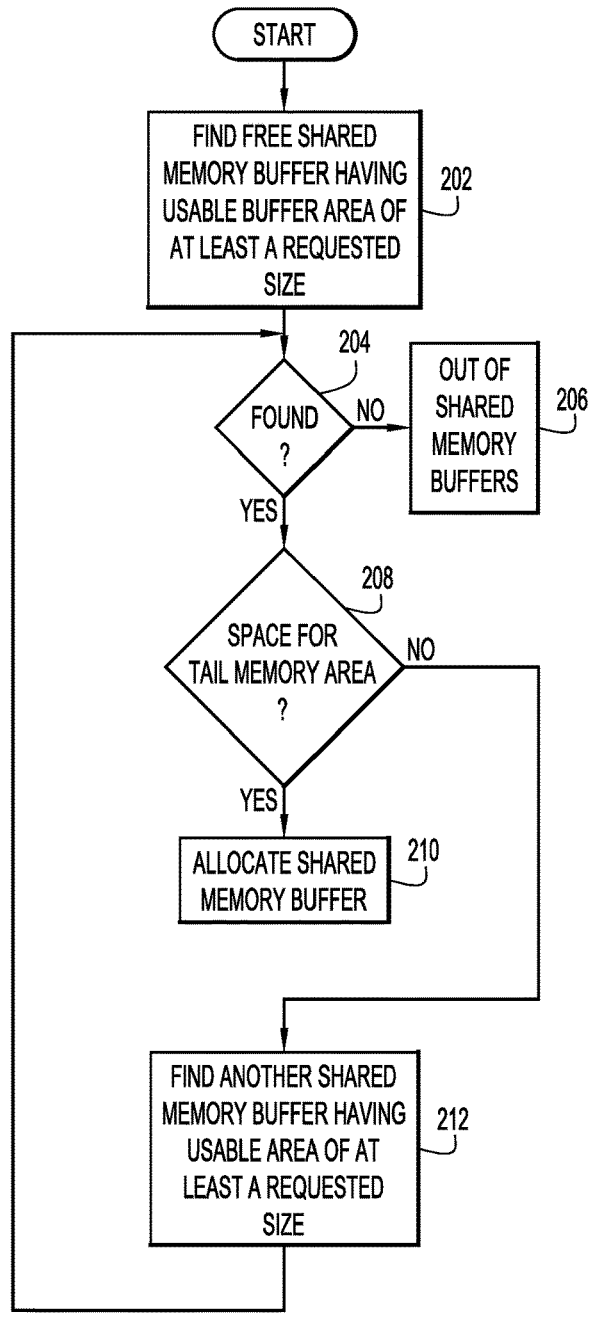
FIG. 2 is a flowchart of an example process for allocating a shared memory buffer according to various embodiments.

FIG. 2 is a flowchart that illustrates example processing that may be performed by a first process executing on computing system 100 in various embodiments. The first process may begin by finding a shared memory buffer, from a pool of shared memory buffers or a shared memory heap having a contiguous shared memory area for a usable buffer of at least a requested size (act 202). The first process may then determine whether the shared memory buffer was found (act 204). If the shared memory buffer was not found, then the process may indicate a lack of shared memory buffers (act 206). Otherwise, the process may determine whether there exists enough shared memory for a tail memory area immediately following a shared memory area of the usable buffer within the shared memory buffer (act 208). If enough shared memory exists for the tail memory area, then the shared memory buffer may be allocated (act 210). Otherwise, the process may attempt to find another shared memory buffer having a contiguous shared memory area for a usable buffer of at least the requested size (act 212) and acts 204-212 may be repeated.

Figure 3:
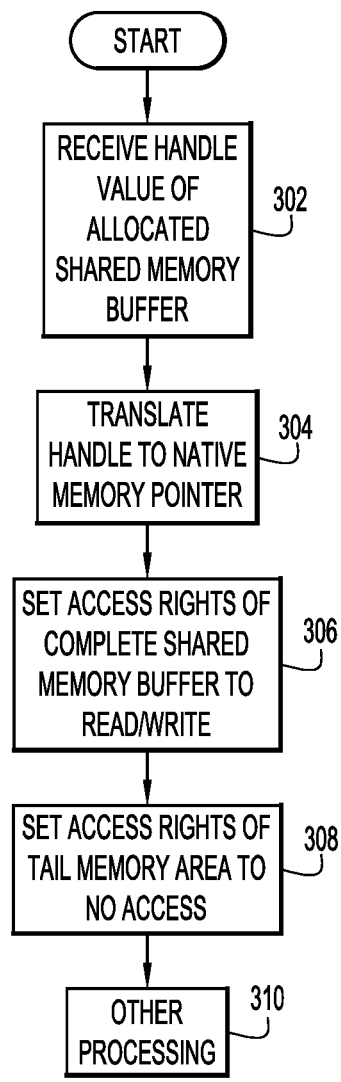
FIG. 3 is a flowchart of an example process for accessing a shared memory buffer using a handle value and setting access rights regarding a usable portion of the shared memory buffer and a tail memory area of the shared memory buffer according to various embodiment.

FIG. 3 is a flowchart of an example process that may be performed by a second process executing on computing system 100 in various embodiments. The process may begin with the second process receiving a handle value of a shared memory buffer allocated by the first process (act 302). The second process may then translate the handle value to a native memory pointer (act 304). Before accessing the shared memory buffer, the second process may set access rights of the complete shared memory buffer to read/write, thereby giving the second process authority to read from and write to any portion of the shared memory buffer (act 306). The second process may then set access rights of a tail memory area to no access, thereby removing any authority for the second process to read from and to write to the tail memory area (act 308). The second process may then proceed to perform other processing (act 310). It should be noted that the setting of the access rights by a process with respect to the shared memory only affects the access rights of that process. Access rights of other processes using the shared memory may remain unaffected by the setting of access rights by the process.

At this point, if the second process attempts to read from or write to the tail memory area, an exception may be raised to an application associated with the second process, thereby causing the application and associated processes to stop executing at or near a point at which program code of the second process attempted to read from or write to the tail memory area.

Figure 4:
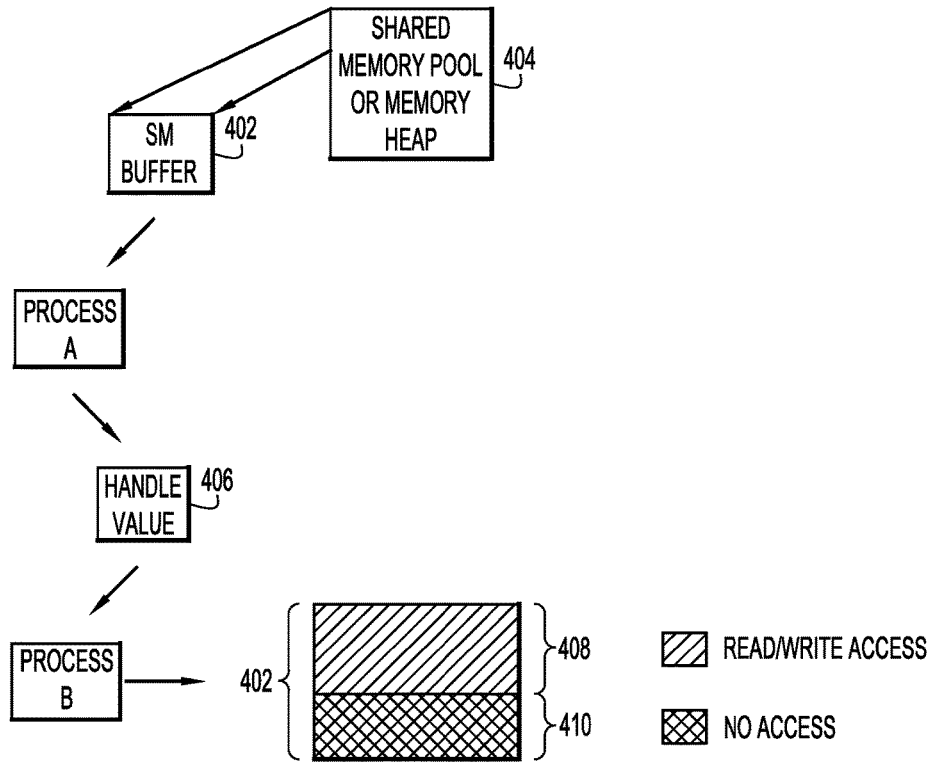
FIGS. 4-6 illustrate a possible scenario that may occur if a process accesses a shared memory buffer using a memory handle value, but fails to set access rights regarding all of the shared memory buffer to read/write before setting access rights regarding a tail memory area of the shared memory buffer to no access.
Figure 5:
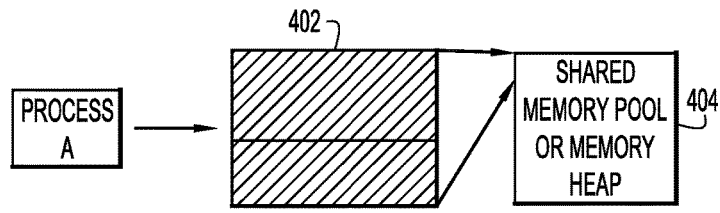
Figure 6:
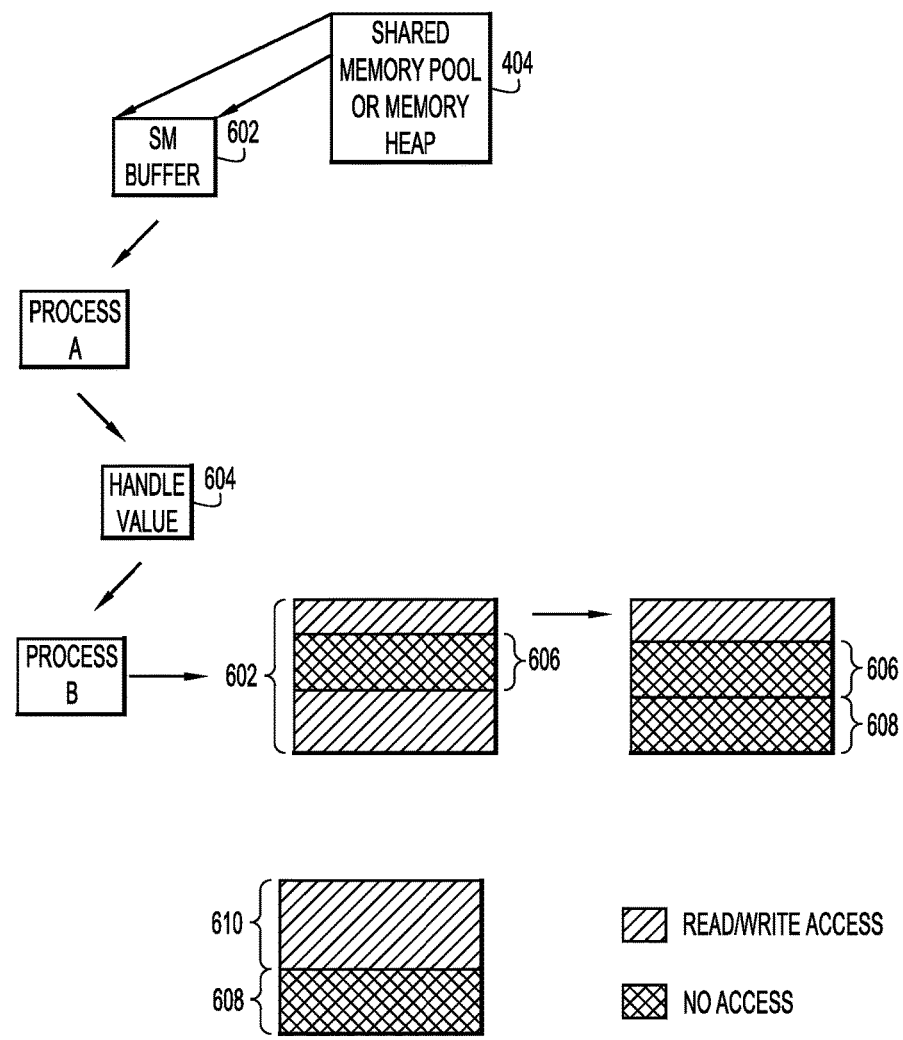

FIGS. 4-6 illustrate why, before a process attempts to access any portion of a shared memory buffer, the process should first set access rights of the complete shared memory buffer to read/write before setting the access rights of the tail memory area to no access. In FIG. 4, process A allocates a shared memory buffer 402 from a shared memory pool or a memory heap of shared memory 404. Process A may then pass a handle value 406 of shared memory buffer 402 to process B so that process B may access shared memory buffer 402.

Process B may access handle value 406 and translate handle value 406 to a native memory pointer to shared memory buffer 402. In various embodiments, before accessing any part of shared memory buffer 402, process B may set access rights to all of shared memory buffer 402 to read/write, thereby authorizing process B to read from and to write to any part of shared memory buffer 402. Process B may then set the access rights regarding a tail memory area 410 of shared memory buffer 402 to no access. As a result, process B would have read and write access to a usable buffer portion 408 of shared memory buffer 402 and no access to tail memory area 410. As previously mentioned, the setting of access rights by process B may only affect process B and no other process. At this point, any attempt by process B to read from or to write to tail memory area 410 of shared memory buffer 402 may cause an exception to be raised and execution of an application including process B to stop.

With reference to FIG. 5, at a later time, process A returns shared buffer 402 to shared memory pool or memory heap 404. However, process B's access rights to tail memory area 410 may still be set to no access while process A may have access rights of read/write to all of shared buffer 402.

With reference to FIG. 6, process A may allocate a shared memory buffer 602, which happens to overlap with a portion of shared memory that previously included tail memory area 410 of shared memory buffer 402. Process A may then provide a handle value 604 of shared memory buffer 602 to process B. Process B may then translate handle value 604 to a native memory pointer. Note that an area 606 of shared memory buffer 602, which was formerly tail memory area 410 to which process B has no access, is included in shared memory buffer 602. At this point, if process B sets access rights regarding a tail memory area 608 of shared memory buffer 602 without first having set access rights regarding all of shared memory buffer 602 to read/write, then process B would have no access rights regarding tail memory area 608 of shared buffer 602 and no access rights regarding area 606. As a result, an exception may be raised when process B accesses a usable buffer portion of shared memory buffer 602, which happens to be located in area 606.

Various embodiments avoid the above-mentioned scenario by having a process set access rights regarding all of a shared memory buffer to read/write and then set the access rights regarding a tail memory area of the shared memory buffer to no access, when the process accesses the shared memory buffer using a handle value. With respect to the example of FIG. 6, this would result in process B having read/write access to all of a usable buffer area 610 of shared memory buffer 602 and no access to tail memory area 608 of shared memory buffer 602.

Figure 7:
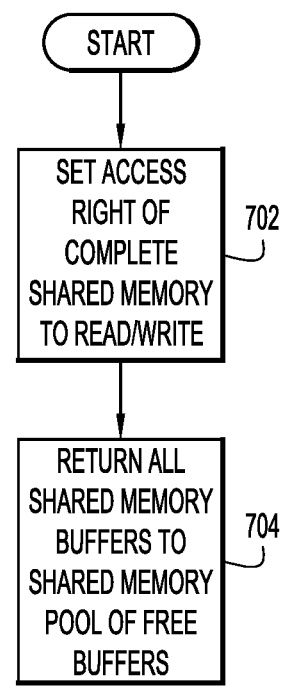
FIG. 7 is a flowchart of an example process that may be executed by a memory manager when the memory manager is being reset according to various embodiments.

In various embodiments, when resetting memory managers, each memory manager, in its own process, may set access rights regarding all of shared memory to read/write before shared memory buffers are returned to a shared memory pool or a shared memory heap, such that each of the processes may reuse shared memory address space. FIG. 7 is a flowchart that illustrates an example process for resetting a memory manager. The process begins with the memory manager setting access rights with respect to all of shared memory to read/write, thereby authorizing the process that includes the memory manager to read and write to any portion of shared memory (act 702). Next, the memory manager may return all shared memory buffers that the process, which includes the memory manager, has been using to a shared memory pool of free buffers or a shared memory heap (act 704).

In some embodiments, whenever a process returns a shared memory buffer to a shared memory pool of free buffers or to a shared memory heap, the process may set access rights to all of the shared memory buffer to read/write.

Although, in the embodiments described above, a supplemental memory area such as a tail memory area of a shared memory buffer is beyond a usable buffer portion of a shared memory buffer, in other embodiments, the supplemental memory area of the shared memory buffer may be before the usable buffer portion of the shared memory buffer. In further embodiments, a first supplemental memory area may be before the usable portion of the shared memory buffer and a second supplemental memory area may be after the usable buffer portion of the shared memory buffer. In such embodiments, access rights regarding both the first supplemental memory area and the second supplemental memory area may be set to no access after first setting the access rights regarding all of the shared memory buffer to read/write.

The environment of present invention embodiments may include any number of computers or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, etc.). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and may communicate via any suitable communications medium (e.g., LAN, WAN, Intranet, Internet, hardwired, modem connection, wireless, etc.). For example, the functions of the present invention embodiments may be distributed in any manner among the various systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to a server and/or client systems. The database systems and/or storage structures may be remote from or local to the computer or other processing systems, and may store any desired data.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method to detect over-access of shared memory shared among a plurality of processes, the machine-implemented method comprising:

setting, by a first process of the plurality of processes, access rights regarding a complete shared memory buffer of contiguous shared memory from the shared memory to read/write before the first process accesses the shared memory buffer, the complete shared memory buffer including a supplemental memory area, the shared memory buffer having been allocated and provided to the first process by a second process of the plurality of processes, and a size of a usable portion of the shared memory buffer being at least a requested size;

setting, by the first process, access rights regarding the supplemental memory area of the shared memory buffer to no access, the supplemental memory area being selected from a group consisting of a first memory area of the shared memory buffer before the usable portion of the shared memory buffer, a second memory area of the shared memory buffer after the usable portion of the shared memory buffer, and both of the first memory area and the second memory area, the setting of the access rights regarding the supplemental memory area to no access being performed after the setting of the access rights regarding the complete shared memory buffer to read/write; and stopping execution of the first process when the first process attempts to access any portion of the supplemental memory area, wherein the setting of the access rights regarding the complete shared memory buffer to read/write before the first process accesses the shared memory buffer avoids having a portion of the usable portion of the shared memory buffer with access rights set to no access when the portion was previously included in a supplemental memory area of a previously used shared memory buffer.

2. The computer-implemented method of claim 1, wherein the setting of the access rights regarding the complete shared memory buffer to read/write and the setting of the access rights regarding the supplemental memory area to no access are performed before the first process accesses the shared memory buffer based on using a memory handle value of the shared memory buffer.

3. The computer-implemented method of claim 1, further comprising:
  obtaining, by the second process, the shared memory buffer to allocate from a source, the source being an item selected from a group of items consisting of a pool of free shared memory buffers and a memory heap of free shared memory;
  determining, by the second process, whether the shared memory buffer has enough room for the supplemental memory area; and
  allocating, by the second process, the shared memory buffer only when the shared memory buffer has enough room for the supplemental memory area.

4. The computer-implemented method of claim 1, further comprising:
  setting, by the second process, the access rights regarding the shared memory buffer to read/write before returning the shared memory buffer to a source, the source being an item selected from a group of items consisting of a pool of free shared memory buffers and a memory heap of free shared memory.

5. The computer-implemented method of claim 1, further comprising:
  setting the access rights with respect to a process of the plurality of processes to read/write regarding all of the shared memory when resetting a memory manager of the process.

6. The computer-implemented method of claim 1, wherein the stopping execution of the first process further comprises:
  raising an exception to an application associated with the first process to cause the application to stop executing.

7. A system to detect over-access of memory shared among a plurality of processes, the system comprising:
  at least one processor executing the plurality of processes of an application;
  a memory, at least a portion of which includes a shared memory; and
  a communication bus connecting the at least one processor with the memory, wherein the at least one processor is configured to perform:
    setting, by a first process of the plurality of processes, access rights regarding a complete shared memory buffer of contiguous shared memory from the shared memory to read/write before the first process accesses the shared memory buffer, the complete shared memory buffer including a supplemental memory area, the shared memory buffer having been allocated and provided to the first process by a second process of the plurality of processes, and a size of a usable portion of the shared memory buffer being at least a requested size;
    setting, by the first process, access rights regarding the supplemental memory area of the shared memory buffer to no access, the supplemental memory area being selected from a group consisting of a first memory area of the shared memory buffer before the usable portion of the shared memory buffer, a second memory area of the shared memory buffer after the usable portion of the shared memory buffer, and both of the first memory and the second memory area, the setting of the access rights regarding the supplemental memory area to no access being performed after the setting of the access rights regarding the complete shared memory buffer to read/write; and
    stopping execution of the first process when the first process attempts to access any portion of the supplemental memory area, wherein
  the setting of the access rights regarding the complete shared memory buffer to read/write before the first process accesses the shared memory buffer avoids having a portion of the usable portion of the shared memory buffer with access rights set to no access when the portion was previously included in a supplemental memory area of a previously used shared memory buffer.

8. The system of claim 7, wherein the setting of the access rights regarding the complete shared memory buffer to read/write, and the setting of the access rights regarding the supplemental memory area to no access are performed before the first process accesses the shared memory buffer based on using a memory handle value of the shared memory buffer.

9. The system of claim 7, wherein the at least one processor is further configured to perform:
  obtaining, by the second process, the shared memory buffer to allocate from a source, the source being an item selected from a group of items consisting of a pool of free shared memory buffers and a memory heap of free shared memory;
  determining, by the second process, whether the shared memory buffer has enough room for the supplemental memory area; and
  allocating, by the second process, the shared memory buffer only when the shared memory buffer has enough room for the supplemental memory area.

10. The system of claim 7, wherein the at least one processor is further configured to perform:
  setting, by the second process, the access rights regarding the shared memory buffer to read/write before returning the shared memory buffer to a source, the source being an item selected from a group of items consisting of a pool of free shared memory buffers and a memory heap of free shared memory.

11. The system of claim 7, wherein the at least one processor is further configured to perform:
setting the access rights with respect to a process of the plurality of processes to read/write for all of the shared memory when resetting a memory manager of the process.

12. The system of claim 7, wherein the stopping execution of the first process further comprises:
raising an exception to an application associated with the first process to cause the application to stop executing.

13. A computer program product comprising:
at least one computer readable storage medium having computer readable program code embodied therewith for execution on at least one processor, the computer readable program code being configured to be executed by the at least one processor to perform:
setting, by a first process of a plurality of processes, access rights regarding a complete shared memory buffer of contiguous shared memory from a shared memory to read/write before the first process accesses the shared memory buffer, the complete shared memory buffer including a supplemental memory area, the shared memory buffer having been allocated and provided to the first process by a second process of the plurality of processes, and a size of a usable portion of the shared memory buffer being at least a requested size;
setting, by the first process, access rights regarding the supplemental memory area of the shared memory buffer to no access, the supplemental memory area being selected from a group consisting of a first memory area of the shared memory buffer before the usable portion of the shared memory buffer, a second memory area of the shared memory buffer after the usable portion of the shared memory buffer, and both of the first memory and the second memory area, the setting of the access rights regarding the supplemental memory area to no access being performed after the setting of the access rights regarding the complete shared memory buffer to read/write; and
stopping execution of the first process when the first process attempts to access any portion of the supplemental memory area, wherein the setting of the access rights regarding the complete shared memory buffer to read/write before the first process accesses the shared memory buffer avoids having a portion of the usable portion of the shared memory buffer with access rights set to no access when the portion was previously included in a supplemental memory area of a previously used shared memory buffer.

14. The computer program product of claim 13, wherein the setting of the access rights regarding the complete shared memory buffer to read/write, and the setting of the access rights regarding the supplemental memory area to no access are performed before the first process accesses the shared memory buffer based on using a memory handle value of the shared memory buffer.

15. The computer program product of claim 13, wherein the computer readable program code is further configured to be executed by the at least one processor to perform:
obtaining, by the second process, the shared memory buffer to allocate from a source, the source being an item selected from a group of items consisting of a pool of free shared memory buffers and a memory heap of free shared memory;
determining, by the second process, whether the shared memory buffer has enough room for the supplemental memory area; and
allocating, by the second process, the shared memory buffer only when the shared memory buffer has enough room for the supplemental memory area.

16. The computer program product of claim 13, wherein the computer readable program code is further configured to be executed by the at least one processor to perform:
setting, by the second process, the access rights regarding the shared memory buffer to read/write before returning the shared memory buffer to a source, the source being an item selected from a group of items consisting of a pool of free shared memory buffers and a memory heap of free shared memory.

17. The computer program product of claim 13, wherein the stopping execution of the first process further comprises:
raising an exception to an application associated with the first process to cause the application to stop executing.

* * * * *